United States Patent [19]

Stockli et al.

[11] 4,381,796
[45] May 3, 1983

[54] AUTOMATIC PRESSURE VALVE

[75] Inventors: Andre Stockli, 2086 Prieur, Montréal. (Québec); Gilles Desmarais, St-Foy, both of Canada

[73] Assignee: Andre Stockli, Montréal, Canada

[21] Appl. No.: 144,882

[22] Filed: Apr. 29, 1980

[51] Int. Cl.³ .......................................... F16K 11/20
[52] U.S. Cl. ............................. 137/596.2; 137/224; 137/522
[58] Field of Search ............. 2/2.1 R, DIG. 3; 9/319; 128/202.14, 205.24; 137/224, 226, 522, 523, 493, 596.2

[56] References Cited

U.S. PATENT DOCUMENTS

| | | | |
|---|---|---|---|
| 2,463,516 | 3/1949 | Burkhardt | 137/523 X |
| 2,986,159 | 5/1961 | Snyder | 137/493 |
| 3,588,041 | 6/1971 | Johannisson | 137/523 X |
| 3,604,452 | 9/1971 | Daniels | 137/523 |
| 3,783,898 | 1/1974 | Kirkman | 137/596.2 |
| 3,993,095 | 11/1976 | Flynn | 128/205.24 X |
| 4,054,132 | 10/1977 | Deeds | 128/202.14 |
| 4,167,952 | 9/1979 | Reinicke | 137/493 |

Primary Examiner—Robert G. Nilson
Attorney, Agent, or Firm—Oblon, Fisher, Spivak, McClelland & Maier

[57] ABSTRACT

An automatic valve for a pressure suit. The valve has a valve body with an inlet port therein having an actuable valve member to admit pressurized gas in a valve chamber in communication with a suit to which the valve is secured. An adjustable cover member is displaceably secured to the body and has at least one exhaust orifice. An outlet port is provided in the body and communicates with the valve chamber and has an automatic pressure regulating valve mechanism therein. The valve mechanism is adjustable by a pressure biasing member controlled by a first displacement of the adjustable cover member to control the pressure of the gas in the suit by automatically exhausting some of the gas through the outlet port when the internal pressure exceeds a preset pressure of the mechanism. A displaceable valve member is associated with the valve mechanism and displaceable by a second displacement of the cover member to exhaust gas from the valve chamber and the inside of the suit through the outlet port.

17 Claims, 8 Drawing Figures

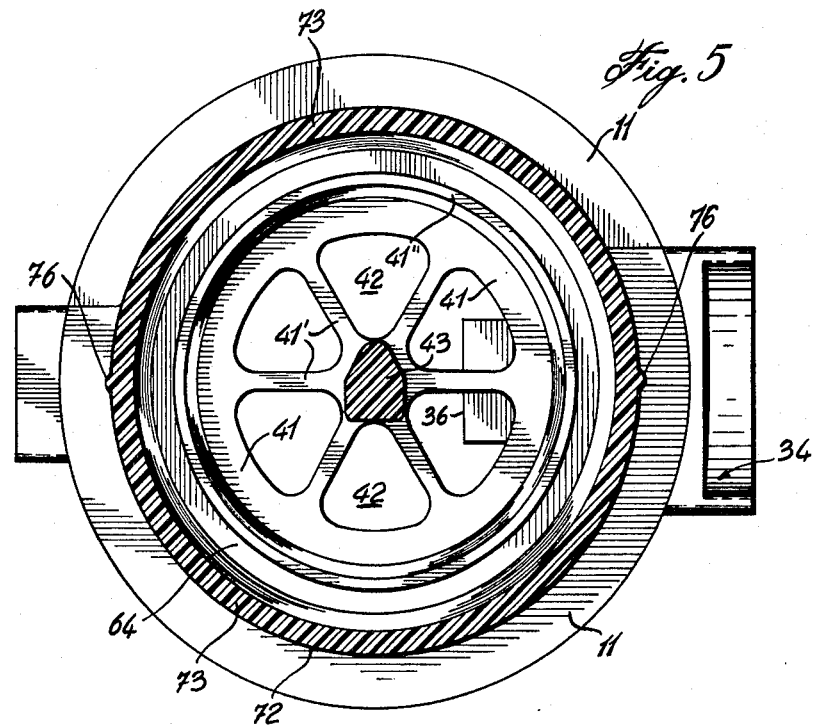
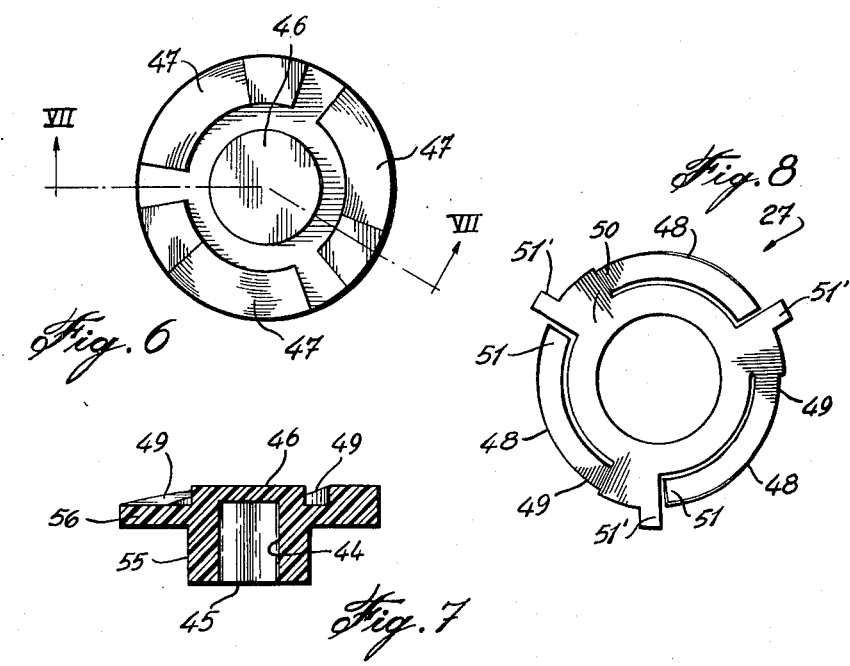

AUTOMATIC PRESSURE VALVE

BACKGROUND OF THE INVENTION (a) Field of the Invention

The present invention relates to an automatic valve for pressure enclosures and wherein the valve provides for ingress and egress of pressurized gas and the regulation of the internal pressure in the enclosure.

(b) Description of Prior Art

Various types of valve elements have heretofore been provided for use with pressure enclosures, such as pressure suits, and to effect specific functions. For example, valves are provided to admit air in a pressure suit while other valves are provided to exhaust air. There is also provided automatic valves which perform dual functions of controlling the exhaust of ventilation air and at the same time preventing ingress of a liquid such as water when the suit is immersed in that liquid. Such valve elements may also be used in conjunction with other specific type apparel, such as boots, vests, or other objects where air is to be admitted and exhausted therefrom. Heretofore, no one has provided an automatic valve which would admit a pressurized gas and also be capable of exhausting the captive gas admitted. Still further, there is a need for the same valve to provide for adjustment, by the user, to regulate the amount of pressure of the admitted gas to desired values.

SUMMARY OF INVENTION

It is a feature of the present invention to provide an automatic valve which provides all of the above-desired features.

It is a further feature of the present invention to provide an automatic valve which will admit a pressurized gas, exhaust a pressurized gas, and further provide adjustment to regulate the pressure of the admitted gas and to automatically exhaust gas when a preset pressure is exceeded.

Another feature is to provide a valve which can connect to the standard air tanks of an underwater diver, and wherein the regulation is manually adjustable. The valve also has a minimum number of parts, is corrosion proof and provides a leak-proof attachment seal with a wet suit to be pressurized.

According to the above features, from a broad aspect, the present invention provides an automatic valve for a pressure enclosure submersible in a liquid medium and wherein the valve comprises a valve body with an inlet port therein having an actuable valve member to admit pressurized gas in a valve chamber in communication with an enclosure to which the valve is secured. An adjustable cover member is displaceably secured to the body and has at least one exhaust orifice. An outlet port is provided in the body and communicates with the valve chamber and has an automatic pressure regulating valve mechanism therein preventing liquid ingress to said chamber. The valve mechanism is adjustable by a pressure biasing member controlled by a first displacement of the adjustable cover member to control the pressure of the gas in the enclosure by automatically exhausting some of the gas through the outlet port when the internal pressure exceeds a preset pressure of the mechanism. A displaceable valve member is associated with the valve mechanism and displaceable by a second displacement of the cover member to exhaust gas from the enclosure through the outlet port while preventing ingress of liquid to said chamber.

BRIEF DESCRIPTION OF DRAWINGS

A preferred embodiment of the present invention will now be described with reference to the example thereof illustrated by the accompanying drawings wherein:

FIG. 5 is a top view of the valve body with the cover and the automatic valve mechanism removed;

FIG. 6 is a top view of the displaceable pressure member;

FIG. 7 is a section view along cross-section lines 7-7 of FIG. 6; and

FIG. 8 is a plan view of the pressure biasing member.

DESCRIPTION OF PREFERRED EMBODIMENTS

Figure 1:
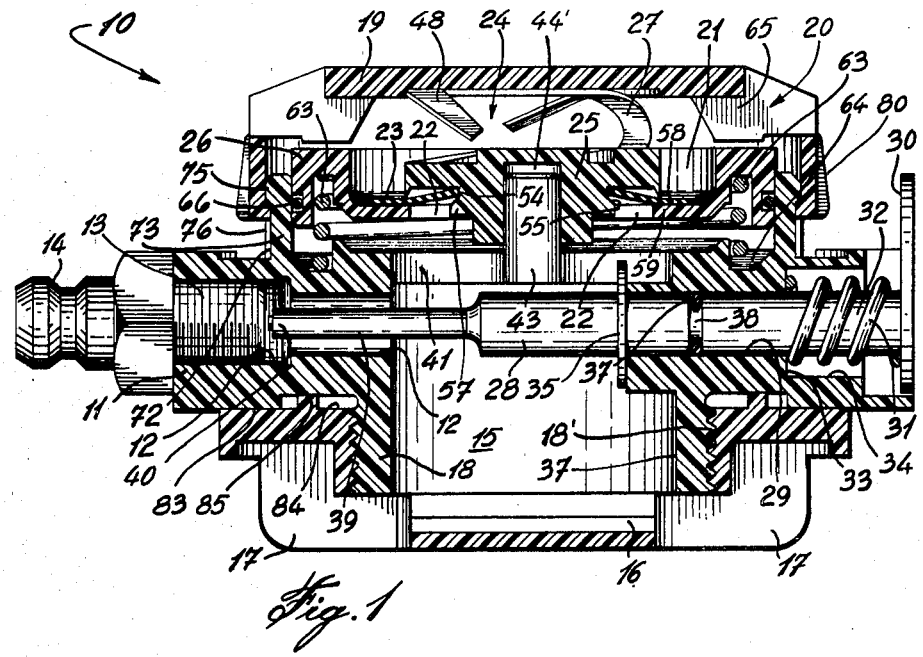
FIG. 1 is a sectional view illustrating the constituent assembled parts of the automatic valve of the present invention.

Referring now to the drawings, and more particularly to FIG. 1, there is shown generally at 10, the automatic valve of the present invention and particularly, but not exclusively, adapted to be connected to a pressure suit (not shown). The valve 10 comprises essentially a valve body 11 having an inlet port 12 therein. An actuable valve member 13 is secured within the inlet port 12 in a valve chamber 15 and admits pressurized gas therein through the male connector 14 which is adapted to connect to a conduit (not shown) connected at a far end to a pressurized gas reservoir such as the gas tanks of underwater divers. The inlet port 12 leads to a valve chamber 15 which is in open communication with the outside of the valve body through a bottom orifice 16 provided in a bottom clamping member 17. The valve body 11 is provided with a lower wall portion 18 in threaded engagement at 18' with the clamping member 17.

An adjustable cover member 19 is displaceably secured to a top annular side wall 73 of the body 11 and has at least one exhaust orifice 20 therein. An outlet port 21 is provided in the body 11 and communicates with the valve chamber 15 through an oultet port orifice 22 which is normally obstructed or sealed by a seal member 23. The seal member 23 forms part of an automatic pressure regulating valve mechanism 24.

The automatic regulating valve mechanism 24 comprises a displaceable pressure member 25, a displaceable valve member 26, a pressure biasing member 27 and the seal member 23. The valve mechanism is adjustable by the pressure biasing member 27 which is controlled by a first displacement of the adjustable cover member 19 to control the amount of internal pressure of the gas in a suit (not shown) which is connected between the bottom clamping member 17 and the valve body 11, as will be described later. This internal pressure in the suit is controlled by automatic exhaust of gas through the outlet port 21 when the internal pressure in the suit, or in the valve chamber 15 in communication therewith, exceeds a preset pressure of the mechanism 24. This preset pressure is determined by rotational adjustment of the cover member 19 which in turn varies the pressure exerted by the pressure biasing member 27, as will be described later. Exhaust of the gas contained in the suit or in the valve chamber 15 is also achieved by depressing the cover 19 downwardly to displace the displaceable valve member 26 to exhaust gas through the outlet port 21, as will also be described later.

Figure 2:
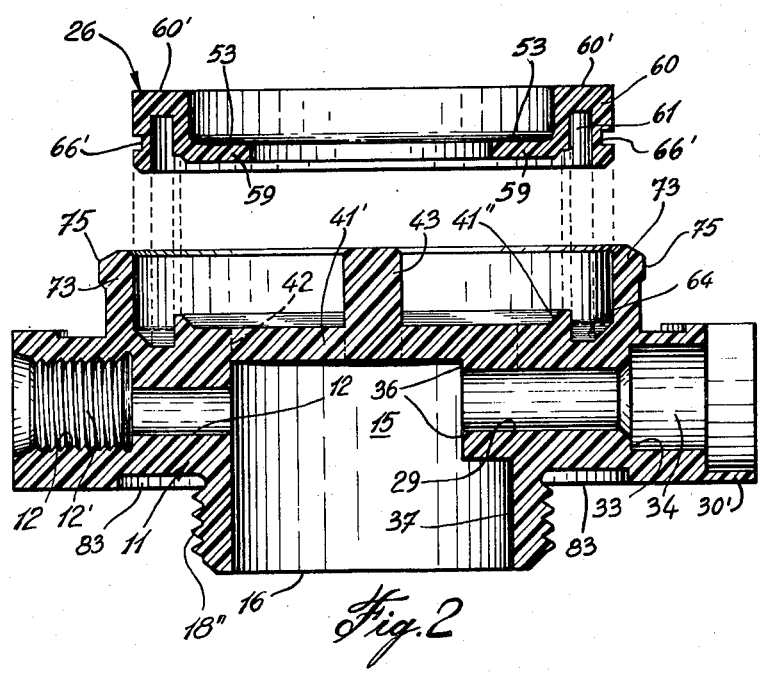
FIG. 2 is an exploded section view of the valve body and the displaceable valve member.

As shown in FIGS. 1 and 2, the actuable valve 13 is actuable by a pusher rod 28 which is secured in the valve body 11 and extends through a rod orifice 29 provided therein. The pusher rod 28 is axially displaceable within the rod orifice 29 by an outer pusher end plate 30 which is secured to the outer end of the pusher rod 28 exteriorly of the body 11. The end plate 30 is guided by guide cavity walls 30'. The pusher rod 28 is biased in the position as shown in FIG. 1 by a biasing means, herein constituted by a coil spring 31 retained about the outer end portion 32 of the rod and abutting at one end with a back wall of the pusher member 30 and abutting at a further end with a back wall 33 of a spring receiving cavity 34 provided in an exterior face of the body 11.

In order to limit the outer axial displacement of the pusher rod 28, a stop member 35 is secured about the pusher rod 28 and located in the valve chamber 15 and abuts a stop face 36 formed in the inner wall 37 of the valve chamber 15. To prevent any leakage of gas about the rod 35 through the orifice 29, there is provided an O-ring seal 37 disposed in an annular groove 38 about the periphery of the pusher rod 28.

The inner end of the rod 28 is provided with a pusher rod portion 39 of reduced diameter and the free end 40 thereof is engageable with the actuable valve element 13 to operate a displaceable member (not shown) therein to open a passage in the valve element to permit ingress of pressurized gas into the valve chamber 15.

Referring now additionally to FIG. 5, it can be seen that the valve chamber 15 has a top wall 41 having a plurality of orifices 42 therein. A central support post extends vertically above the top wall 41 and is configured to receive and support and lock the displaceable pressure member 25 thereover.

As shown in FIGS. 6 and 7, the displaceable pressure member 25 is provided with a central cavity 44 having a bottom opening 45 and a cross-section configured to receive the central support post 43 in sliding fit therein. The top face 46 of the pressure member 25 is provided with three arcuate sloping wall portions 47 located in a respective section of the top face. Each section is disposed within a 120° arc. The purpose of these sloping wall portions 47 is to provide for the adjustment of pressure exerted on the pressure member 25 by the pressure biasing member 27 when the cover is rotated. A top space 44' in the bottom of the cavity 44 permits axial displacement of the member 25 on the post 43.

FIG. 8 illustrates the construction of the pressure biasing member 27. This member is a leaf-like spring flat disc 50 having one or more arcuate spring arms 48, herein shown three spring arms 48, extending angularly upwards (see FIG. 1) from a bottom end portion 49 in the plane of the flat disc 50 and terminating at a top end 51 elevated from the plane of the disc 50. The flat disc 50 is further provided with index fingers 51' for securing the disc 50 in finger receiving cavities 52 located in the inner wall 53 of the cover (see FIG. 4). Thus, the arcuate spring arms 48 will extend out of the inner wall 53 of the cover, as shown in FIG. 1.

As shown in FIGS. 1 and 2, the arcuate spring arms 48 extend downwardly toward the displaceable pressure member 25, and although the spring arms 48 are shown fragmented at the ends due to the section cut of the drawing, they each have their top end 51 resting on a respective one of the three sloping arcuate wall portions 47 provided on the top face 46 of the displaceable pressure member. As the cover member 19 is rotated, the top end 51 of each spring arm 48 will be displaced along their respective sloping walls 47 and thus each arcuate spring arm 48 will compress evenly toward their bottom end 41 or the plane of the flat disc 50. As the spring arms 48 are displaced toward the flat disc 50, the biasing pressure in the spring member 27 will increase. Accordingly, the pressure on the top face 46 of the displaceable pressure member 25 will increase and the member 25 will move down on the post 43. This increased pressure is then transmitted onto the seal member 23 and thereby requiring a higher internal pressure within the valve chamber 15 to escape by lifting the seal member 23 from peripheral engagement with the top face 53 of the displaceable valve member 26. The valve member 26 is held substantially stationary by a spring 63 having a higher biasing force than the spring member 27.

The seal member 23 is a concave ring member having its concavity facing upwardly of the valve toward the cover 19. The seal member 23 is an annular ring member having a center bore 54 adapted to be secured about the other side wall 55 of the pressure member 25 and retained therein under the top wall 56 thereof by suitable means such as bridge portions 57 (see FIG. 1).

As shown more clearly in FIG. 2, the displaceable valve member 26 is movably retained within the valve body 11 and constitutes an annular valve seat provided by its flange portion 59 which is spaced from the side wall 55 of the pressure member 25 to define the outlet port orifice 22 therebetween. The displaceable valve member 26 is further provided with a contour wall portion 60 defining an inner cavity 61 to retain therein the top end of the coil spring 63 which is located in a spring retaining cavity 64 formed within the valve body 11 about the chamber top wall 4. The coil spring 63 biases the displaceable valve member 26 upwardly to maintain bottom pressure on the seal member 23. However, the upward displacement of the member 26 is limited by its abutment with the seal member 23 which is biased downwardly. Abutment ribs 65 depend from the inner face 53 of the cover member 19 and will limit upward movement of the member 26 by abutting its upper wall face 60'. This upward displacement has a smaller trajectory than the upward displacement of the pressure member 25 when the internal pressure in the chamber 15 exceeds the pressure of the biasing member 27. This permits the outlet port orifice 22 to open due to release of internal pressure until it drops to the preset pressure of biasing member 27.

The contour wall 60 is provided with an O-ring seal 66 disposed in an annular slot 66' about its outer circumference to prevent any leakage of pressurized gas between the valve body side wall 73 and the displaceable valve member 26. A guide rib 41'' guides the coil spring 63 centrally when depressed thereagainst.

Figure 3:
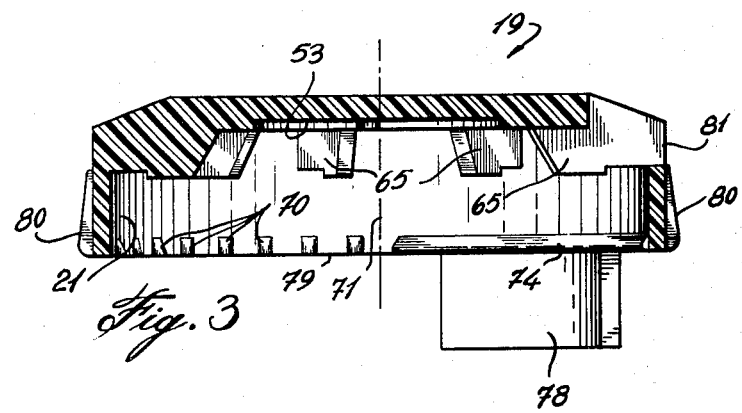
FIG. 3 is a sectional view of the cover member.
Figure 4:
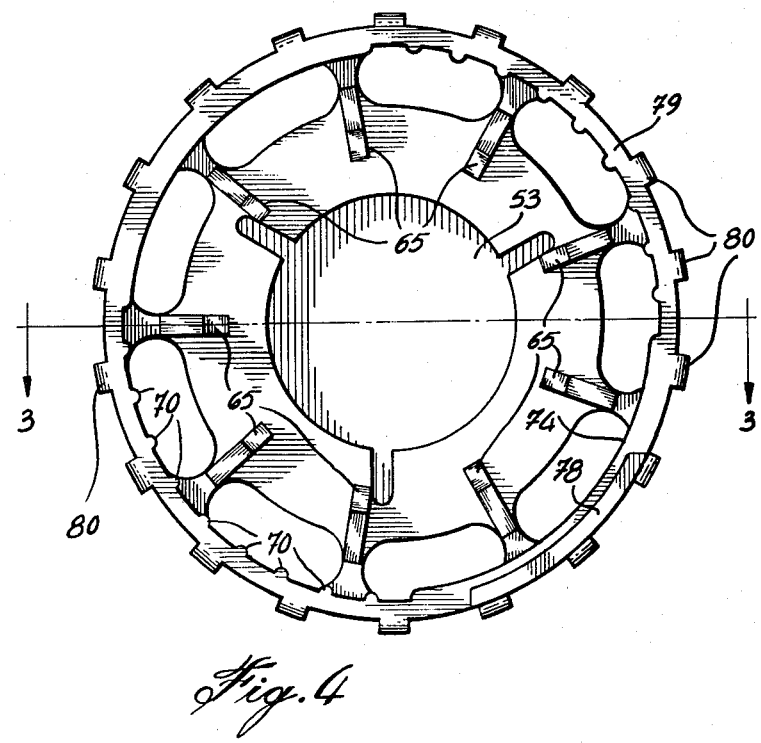
FIG. 4 is an inside plan view of the cover.

As previously described, the cover member 19 is displaceable in a first direction, and this first direction is constituted by the rotation of the cover 19 whereby to regulate or vary the pressure of the pressure biasing member 27 acting on the pressure member 25. As shown in FIGS. 3 and 4, in order to provide regulated adjustment of this pressure, a plurality of indexing ribs 70 are formed and equidistantly spaced in the inner peripheral face 71 of the cover. The cover member 19 is held about a top circumferential side face 72 of the top annular side wall 73 of the valve body 11. This retention is achieved by at least one elongate peripheral retention ridge 74 provided in the lower peripheral inner face 71 of the cover 19. Two such ridges 74 are oppositely disposed on the inner peripheral face 71 of the cover and these are displaceable about the outer face 72 of the wall 73 by rotation of the cover 19 and are held thereagainst by retention ridges 75 extending outwardly of the outer wall 72 in a top portion thereof. In order to evacuate the pressure within the pressure suit, the cover member 19 is depressed toward the valve body 11. The abutment ribs 65 will engage the top wall 60' of the member 26 and push it downwardly against the spring force of spring 63. The flange portion 59 will move downwardly and separate from the seal member 23. Thus, the outlet ports 21 and 22 are in communication with the chamber 15 and the suit will be evacuated. Once the air is evacuated from the suit, the pressure of the water exteriorly of the suit and valve will act on the concave seal 23 to cause it to obstruct the outlet port and prevent ingress of water.

As shown in FIG. 5, two stop ribs 76 are formed in the side wall 72 and extend vertically therealong. The ribs 76 are diametrically opposed in the outer face 72 of the wall 73. By rotating the cover about the wall 72, the indexing ribs 70 will be forced to ride over the stop ribs 76 as the cover member is constructed of a resilient material permitting some resiliency to cause the cover to flex. The top face of the cover may be provided with index numeral markings (not shown) coinciding with each of the gripping ribs 80 whereby the operator has an indication of the amount of pressure that will be exerted by the biasing member 27. The cover is retained at a desired rotated position by the stop ribs 76 which is captive between a selected pair of the indexing ribs 70. As shown in FIG. 4, the indexing ribs 70 are provided in opposed portions of the cover member and extend throughout an arc of about 90°. The peripheral retaining ridges 74 extend between the indexing rib portions.

As shown in FIGS. 3 and 4, a locating flange 78 depends from the lower edge 79 of the cover member 19 and is used to properly locate the cover about the side wall 73. The indexing ribs are each spaced apart on an angle of 10° from the center of the cover member. Thus, the pressure can be adjusted in nine increments along the 90° displacement of the cover. The gripping ridges 80 also facilitate rotation of the cover. Furthermore, as shown in FIG. 4, a plurality of exhaust orifices 20 are provided circumferentially about the cover to provide quick escape of exhaust gases.

In order to secure the valve body 11 to a suit, it is firstly required to form a circular hole in the suit. The bottom clamping member 17 is removed from the lower wall portion 18 of the body 11 by unthreading their connection at 18'. The lower wall portion 18 is then positioned into the circular hole formed in the suit, and this hole is of a diameter slightly larger than the threads 18" of the lower wall portion 18. Thus, a peripheral portion of the suit will lie against the annular wall portion 83 of the valve body 11.

The upper clamping face 84 of the bottom clamping member 17 is provided with an annular clamping ridge 85 which, when the clamping member 17 is threaded about the wall lower portion 18, will clamp the suit fabric along an annular ring portion located in an annular groove 83' in the wall 83 whereby to concentrate clamping pressure therein to provide a leak-proof seal.

In order to prevent the bottom clamping member 17 from unthreading itself during use, positive locking means (not shown) may be provided to prevent further rotation between the clamping member 17 and the wall lower portion 18 after the valve is secured to a pressure suit.

It is within the ambit of the present invention to provide any obvious modifications of the example of the preferred embodiment described hereinabove, provided such modifications fall within the scope of the appended claims. Although the automatic pressure valve described herein is preferably for use with a pressure suit, it need not be limited to that application. The valve herein described is constructed of ABS plastics and stainless steel to prevent any corrosion from taking place. It may also be constructed from other materials.

We claim:

1. An automatic valve for a pressure enclosure submersible in a liquid medium, said valve comprising a valve body, an inlet port in said body having an actuable valve member to admit pressurized gas in a valve chamber in communication with an enclosure to which said valve is secured, an adjustable cover member displaceably secured to said body and having at least one exhaust orifice, an outlet port in said body communicating with said valve chamber and having an automatic pressure regulating valve mechanism therein preventing liquid ingress to said chamber, said valve mechanism being adjustable by a pressure biasing member controlled by a first displacement of said adjustable cover member to control the pressure of said gas in said enclosure by automatically exhausting some of said gas through said outlet port when said pressure exceeds a preset pressure of said mechanism, a displaceable valve member associated with said valve mechanism and displaceable by a second displacement of said cover member to exhaust gas from said enclosure through said outlet port while preventing ingress of liquid to said chamber.

2. A valve as claimed in claim 1 wherein said valve mechanism comprises a seal member to seal said outlet port and to prevent external fluids from entering said valve chamber through said outlet port.

3. A valve as claimed in claim 2 wherein a displaceable pressure member is secured for limited displacement in said outlet port, said displaceable valve member being positioned about said displacement pressure member to define an oultet port orifice therebetween, said seal member being displaceably held between said displaceable pressure and valve members and sealing said outlet port orifice.

4. A valve as claimed in claim 3 wherein said pressure biasing member is a compressible pressure member secured between said cover member and displaceable pressure member, said pressure biasing member being compressible and expandable by rotation of said cover member, said rotation constituting said first displacement of said cover member.

5. A valve as claimed in claim 4 wherein said compressible pressure member is a leaf-like spring member having one or more spring arms extending angularly between a bottom end thereof secured in said cover member and a top end thereof held on a sloping wall formed in a top face of said displaceable pressure member, said spring member top end being displaced on said sloping wall by said rotation of said cover member to vary the horizontal spacing between said top and bottom ends whereby to vary the compression or spring force of said spring member acting on said seal member and in opposition to pressure in said valve chamber.

6. A valve as claimed in claim 5 wherein said spring member is a flat disc spring member having three identical arcuate spring arms extending angularly upwards of said disc on a common side thereof and spaced 120° apart, index fingers protruding from a circumferential edge of said disc, said fingers nesting in a respective finger receiving cavity in an inner face of said cover member whereby said first rotation of said cover member will cause said spring member to be rotated and the top end of said spring arms to be displaced on a respective one of three arcuate sloping walls provided on a top face of said displaceable pressure member.

7. A valve as claimed in claim 6 wherein said cover member is provided with peripheral retention means in a first part of an inner peripheral face thereof, indexing ribs equidistantly spaced in at least one second part of said inner peripheral face, at least one stop rib in an outer peripheral face of said valve body, said first rotation of said cover member causing said indexing ribs to move in frictional contact over said stop rib whereby said cover is retained in a desired rotated position by said stop rib located between a selected pair of said indexing ribs.

8. A valve as claimed in claim 7 wherein there is provided two opposed groups of indexing ribs, each group being associated with a respective one of two opposed stop ribs, said indexing ribs being spaced apart at an angle of 10° from the center of said cover member and extending along a 90° arc, said 90° arc coinciding with said sloping wall of said displaceable pressure member.

9. A valve as claimed in claim 7 wherein said retention means is at least one retaining ridge for retention about an outer wall of said valve body and for limited axial displacement thereover, said outer wall of said valve body having a top peripheral stop ridge to retain said cover member, said limited axial displacement constituting said second displacement, abutment means secured internally of said cover member and abutting said displaceable valve member to displace it downwardly when said cover member is pressed on said valve body to cause an opening in said outlet port orifice to discharge gas from within said valve chamber through said outlet port.

10. A valve as claimed in claim 9 wherein said displaceable valve member is an annular valve seat having a contour wall and a flange about a central opening, spring means engaged with said contour wall to bias said valve seat toward said cover member, said seal member abutting a top face of said flange to arrest the upward movement of said valve seat and obstruct said outlet port orifice.

11. A valve as claimed in claim 10 wherein said abutment means is a plurality of shoulders formed in said cover member and aligned for engagement with a top face of said contour wall when said cover member is pressed on said valve body.

12. A valve as claimed in claim 10 wherein a ring seal is provided in an outer side wall of said contour wall and in frictional engagement with an inner cavity side wall of said valve body to provide a substantially leak-proof seal between said valve chamber and said exhaust orifice in said cover member.

13. A valve as claimed in claim 12 wherein said spring means is a coil spring having a top and bottom circumferential end, said bottom circumferential end being retained in said inner cavity, said top circumferential end being retained in a contour wall cavity inwardly of said outer side wall of said contour wall.

14. A valve as claimed in claim 5 wherein said seal member is a concave ring member having its concavity facing upwardly toward said cover member.

15. A valve as claimed in claim 1 wherein said actuable valve is actuable by a pusher rod secured to said valve body and operable from the exterior of said valve body.

16. A valve as claimed in claim 15 wherein said pusher rod extends through a rod orifice in said valve body for limited axial displacement therein, an outer pusher end secured to said rod externally of said valve body, biasing means for biasing said rod in a disengaged position from said actuable valve, and stop means to limit the biasing displacement of said rod.

17. A valve as claimed in claim 16 wherein said biasing means is a coil spring about said rod and abutting against said outer pusher end, a seal about said rod in a portion displaceable in said rod orifice, said stop means being a ring about said rod for abutment against a side wall portion of said valve chamber about said rod orifice, an inner free end of said rod being engageable with said actuable valve element to permit ingress of pressurized gas into said valve chamber.

* * * * *